United States Patent [19]

Hawley

[11] Patent Number: 5,893,535

[45] Date of Patent: Apr. 13, 1999

[54] RIB FOR BLENDED WING-BODY AIRCRAFT

[75] Inventor: Arthur V. Hawley, Huntington Beach, Calif.

[73] Assignee: McDonnell Douglas Corporation, St. Louis, Mo.

[21] Appl. No.: 08/878,628

[22] Filed: Jun. 19, 1997

[51] Int. Cl.$^6$ ........................................ B64C 1/06
[52] U.S. Cl. ................................. 244/119; 244/36
[58] Field of Search ....................... 244/117 R, 119, 244/36, 123, 131, 13, 125

[56] References Cited

U.S. PATENT DOCUMENTS

| | | | |
|---|---|---|---|
| 1,258,917 | 3/1918 | Lally. | |
| 1,829,922 | 11/1931 | Carns | 244/123 |
| 2,118,254 | 5/1938 | Loedding | 244/36 |
| 2,122,709 | 7/1938 | Barkley | 244/123 |
| 3,249,327 | 5/1966 | Smith, Jr. | 244/36 |
| 3,910,002 | 10/1975 | Lough | 52/283 |
| 4,022,404 | 5/1977 | Greiss | 244/118 |
| 4,066,227 | 1/1978 | Buchsel | 244/118 |
| 5,086,996 | 2/1992 | Roeder et al. | 244/119 |
| 5,115,999 | 5/1992 | Buchsel et al. | 244/118.5 |
| 5,267,420 | 12/1993 | Segman | 52/292 |

FOREIGN PATENT DOCUMENTS

| | | | |
|---|---|---|---|
| 435473 | 3/1912 | France | 244/117 R |
| 856583 | 6/1940 | France | 244/117 R |
| 856669 | 8/1940 | France | 244/119 |

*Primary Examiner*—Galen L. Barefoot
*Attorney, Agent, or Firm*—Westerlund & Powell, P.C.; Robert A. Westerlund; Ramon R. Hoch

[57] ABSTRACT

Structural ribs for providing structural support for a structure, such as the pressure cabin of a blended-wing body aircraft. In a first embodiment, the ribs are generally "Y-shaped", being comprised of a vertical web and a pair of inclined webs attached to the vertical web to extend upwardly and outwardly from the vertical web in different directions, with only the upper edges of the inclined webs being attached to a structural element. In a second embodiment, the ribs are generally "trident-shaped", whereby the vertical web extends upwardly beyond the intersection of the inclined webs with the vertical web, with the upper edge of the vertical web as well as the upper edges of the inclined webs being attached to the same structural element.

14 Claims, 6 Drawing Sheets

RIB FOR BLENDED WING-BODY AIRCRAFT

This invention was made under contract no. NAS1-8673 Task 22 awarded by NASA. The Government has certain rights to this invention.

BACKGROUND OF THE INVENTION

The present invention relates generally to a structural support and, more particularly, to a rib for buttressing the enclosing sections and upper deck floor of an aircraft pressure cabin.

There are primarily two types of aircraft configurations: the more common (conventional) configuration which includes a tail section comprised of vertical and horizontal stabilizers located at the aft end of a tubular fuselage; and the tailless configuration. As to the latter, there are two sub-types: a first type which has no central body, commonly known as a "flying wing," and a second type having a central body which is blended into laterally extending wings.

Figure 1:
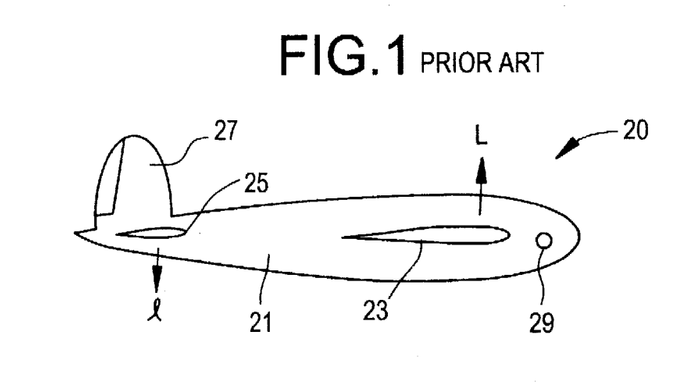
FIG. 1 is a schematic drawing of a conventional aircraft having a tubular fuselage and an attached tail section.

FIG. 1 is a schematic drawing of aircraft 20, a generic example of a conventional aircraft having a tubular fuselage and tail section. Aircraft 20 includes tubular fuselage 21, wing 23, horizontal stabilizer 25, and vertical stabilizer 27. When loaded, aircraft 20 has center of gravity 29. Horizontal stabilizer 25 controls the rotation of aircraft 20 about the pitch axis passing through center of gravity 29.

The vector L represents the lift generated by wing 23. The additional lift generated by fuselage 21 is small in comparison to L, and will be ignored for the limited purpose of this brief discussion. The vector l represents the lift generated by horizontal stabilizer 25. Generally, in normal flight, L acts in the upward, or positive direction, while l acts in the opposite, or negative direction. L has a magnitude much larger that that of l. The angle of attack of aircraft 20 is controlled and stabilized by the pitch moments about center of gravity 29 generated by L and l.

The presence of horizontal stabilizer 25 causes a significant increase in the drag for aircraft 20 in comparison to what the drag would be in the absence of the two aforementioned control elements.

Another drawback inherent to aircraft 20 is the weight of fuselage 21, which serves to provide a pitch moment arm of sufficient length to allow the pitch rotation of aircraft 20 to be controlled by the lift l generated by horizontal stabilizer 25.

Also, in order to sustain flight, L must have a magnitude sufficient to lift the weight of the entire aircraft, including wing 23, fuselage 21, horizontal stabilizer 25 and vertical stabilizer 27. L must thus exceed the weight of wing 23. As a consequence, wing 23 will be subjected to a resultant upward force equal to L minus the weight of wing 23. This resultant force subjects wing 23 to a distributed bending moment, with the maximum moment occurring at the wing root where wing 23 joins fuselage 21.

Wing 23 must be designed to withstand the bending moments induced by the distributed wing lift and weight forces, for the whole prescribed range of flight and ground load conditions. The strengthening of wing 23 also typically takes up additional volume that might otherwise be utilized to carry fuel. Both of the foregoing factors reduce the range of aircraft 20.

Figure 2:
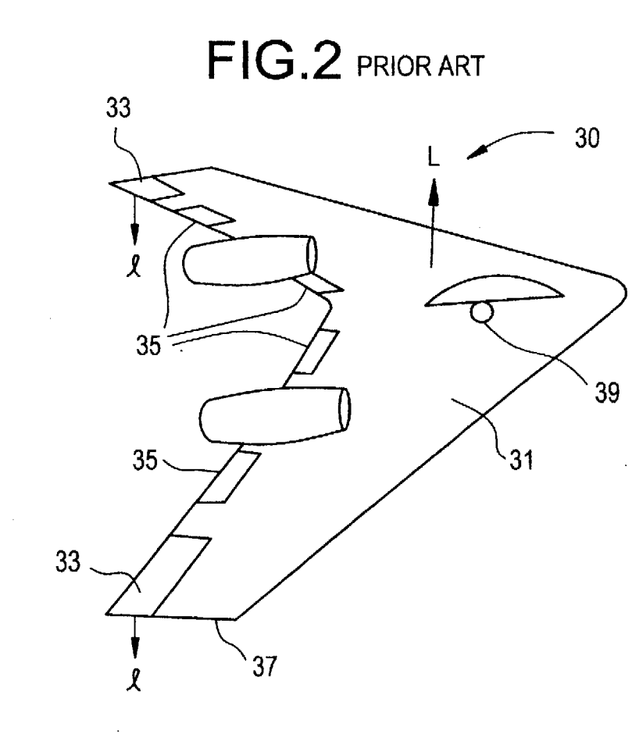
FIG. 2 is a perspective view of a tailless aircraft commonly referred to as a "flying wing;"

The foregoing drawbacks inherent to the conventional aircraft configuration exemplified by aircraft 20 have caused aeronautical engineers to consider tailless designs. A perspective view of tailless aircraft 30, a generic example of a tailless aircraft, is shown in FIG. 2. Aircraft 30 includes main wing section 31, deflectable reflexes 33, deflectable flaps 35, wing tip 37, and center of gravity 39.

Figure 3:
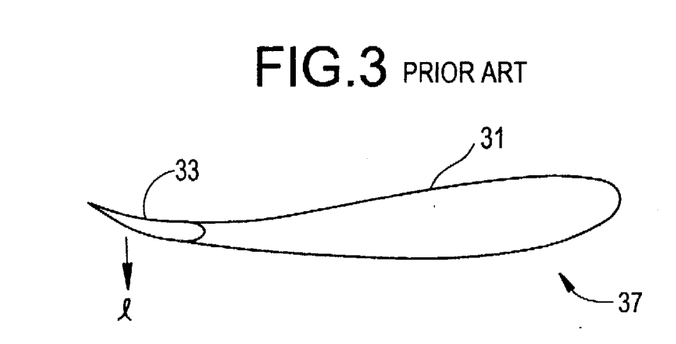
FIG. 3 is a side view of a wing tip of the "flying wing" shown in FIG. 2, and particular shows the deflectable reflex.

FIG. 3 provides a side view of wing tip 37, and shows reflex 33 with particularity. Generally, in normal flight, main wing section 31 generates upward, or positive, lift vector L, whereas each reflex 33 generates a lift vector l acting in the opposite, or negative, direction. The flight of tailless aircraft 30 is controlled and stabilized by the appropriate deflections of reflexes 33 and flaps 35.

As may be discerned by cursory inspection of FIG. 3, tailless aircraft 30 has no horizontal stabilizer projecting into the ambient airstream. Moreover, since the flight of aircraft 30 is controlled and stabilized without a horizontal stabilizer, it does not require the moment arm to this stabilizer otherwise provided by a fuselage. The absence of a horizontal stabilizer and a fuselage lowers the drag coefficient and weight of tailless aircraft 30 in comparison to aircraft 20. Wing section 31 also weighs less than wing 23 of aircraft 20 because it need not be designed to withstand the moment generated by having to lift a fuselage in addition to its own weight.

Although the foregoing advantages inherent to tailless aircraft are widely recognized, modern commercial airliners nonetheless have continued to be developed and produced using designs which incorporate tubular fuselages and tail sections. The reason apparently derives not from comparative performance analyses, but rather from commercial realities confronting airlines and the designers and builders of commercial airliners.

More particularly, modern commercial airliners are typically designed and built as one model in a family of derivative configurations. For conventional aircraft exemplified by aircraft 20, each model varies primarily in the length of its tubular fuselage, with the various family members sharing a similar wing and avionics. By using different members of a manufacturer's family of airliners, the airline company's pilots, mechanics, and other support personnel need only acquire detailed knowledge of one model in the family. They are subsequently able to fly, maintain and repair another model in the same family with substantially less instruction and training than would be required to acquire proficiency with a completely new and unfamiliar aircraft.

The primary means of creating a new model from an existing aircraft is by inserting a hollow axial plug having the identical diameter of the original fuselage, into the fuselage. This increases the length and thus the size of the original aircraft, and avoids the significant investment necessary to develop a completely new model. An airline company will select a model based on the predicted passenger load and the length of the route the aircraft is to service.

Despite offering excellent aerodynamic efficiency, no manufacturer has ventured to produce a tailless base model because of the difficulty and expense which would be entailed to develop variants to satisfy the desires of the airline companies. More particularly, as the "flying wing" type of tailless aircraft obviously does not have a fuselage whose length can be readily changed, this design cannot be easily modified to alter its load carrying capacity. The blended wing-body type of tailless aircraft has a central body which could be modified, but this design has a drawback which has impeded its commercial viability.

More particularly, the pressure cabin enclosed by the body of a blended wing-body aircraft is not cylindrical like that formed by fuselage 21 of conventional aircraft 20, but rather has top and bottom body sections which are flat or gently curved. At altitude, the pressure cabin is subjected to a force caused by the pressure differential between the pressure cabin and the ambient atmosphere, as well as dynamic forces caused by aircraft maneuvers. In a conventional cylindrical pressure cabin, this pressure force is directed radially outwards and creates a tensile force in the cabin's cylindrical shell. In the non-cylindrical body sections of the blended wing-body pressure cabin, the pressure forces are reacted largely by bending of the shell between rib supports.

As a consequence, the pressure cabin body sections for a blended wing-body aircraft would have an increased weight compared with that for a conventional cylindrical shell. The shell would suffer lateral deflections that would increase drag and, with such cyclic deflection occurring on every flight, deleteriously affect the structural integrity of the aircraft body.

To provide an attractive interior layout with adequate space for passengers and their carry-on luggage, it is necessary to space the supporting ribs widely apart. This increases the weight of the pressurized shell and the deformations of the structure.

The foregoing characteristics inherent to the configuration of tailless aircraft have impeded the development of an airliner having a tailless design in spite of its having an aerodynamic efficiency greater than conventional designs having a tubular fuselage and tail section.

Based on the foregoing, it can be appreciated that there presently exists a need for a supporting rib which overcomes the above described disadvantages and shortcomings of the structural supports of the prior art. The present invention constitutes a rib which fulfills this need in the art and, in so doing, facilitates the design of a commercially viable blended wing-body aircraft.

SUMMARY OF THE INVENTION

The present invention encompasses a rib for buttressing the flat or gently curved top and bottom body sections of a pressure cabin of a blended wing-body aircraft. In the case of a pressure cabin which has two decks, the ribs also support a rigid panel separating the two decks. The ribs are located within the pressure cabin, and extend parallel to the axial centerline of the aircraft body.

The ribs are generally "Y-shaped", each rib being comprised of a vertical web and a pair of inclined webs attached to an upper edge of the vertical web. In a double-decked aircraft a first set of ribs are provided between the top body section and the rigid panel separating the two decks, and a second set of ribs are provided between the panel and the bottom body section. A distal edge of the vertical web of each of the second set of ribs is attached to a first structural member, and the distal edges of the inclined webs thereof are attached to a second structural member. A distal edge of the vertical web of each of the first set of ribs is attached to the second structural member, and the distal edges of the inclined webs thereof are attached to a third structural member. The vertical webs of corresponding ones of the first and second sets of ribs are preferably vertically aligned.

In another embodiment of the rib of the present invention, the vertical web of the rib extends beyond the intersection of the inclined webs with the vertical web. The distal edge of this vertical web extension is attached to the same structural member as are the distal edges of the inclined webs of the rib.

The ribs of the present invention oppose the force caused by the pressure differential between the pressurized cabin and the ambient atmosphere at a flying altitude, for the upper body section. In so doing, they allow the top body section to be built lighter than if the loads were resisted only by the presently available "plain" ribs which provide only a single support edge.

The ribs of the present invention also reduce the deflection of the panel separating two decks, and thus allow the panel to be constructed lighter than would otherwise be the case. The ribs utilize space adjacent to and above the overhead storage bins without obstructing the movement of passengers and crew in the central aisles of the aircraft.

The use of the ribs of the present invention thus facilitates the design of a commercially viable tailless airliner, in particular, an airliner having a blended wing-body design that would be competitive in weight and cabin space with conventional aircraft designs incorporating a tubular fuselage and tail section.

BRIEF DESCRIPTION OF THE DRAWINGS

These and various other features and advantages of the present invention will become more readily apparent from the following detailed description taken in conjunction with the accompanying drawings, in which.

DETAILED DESCRIPTION OF THE INVENTION

Figure 4:
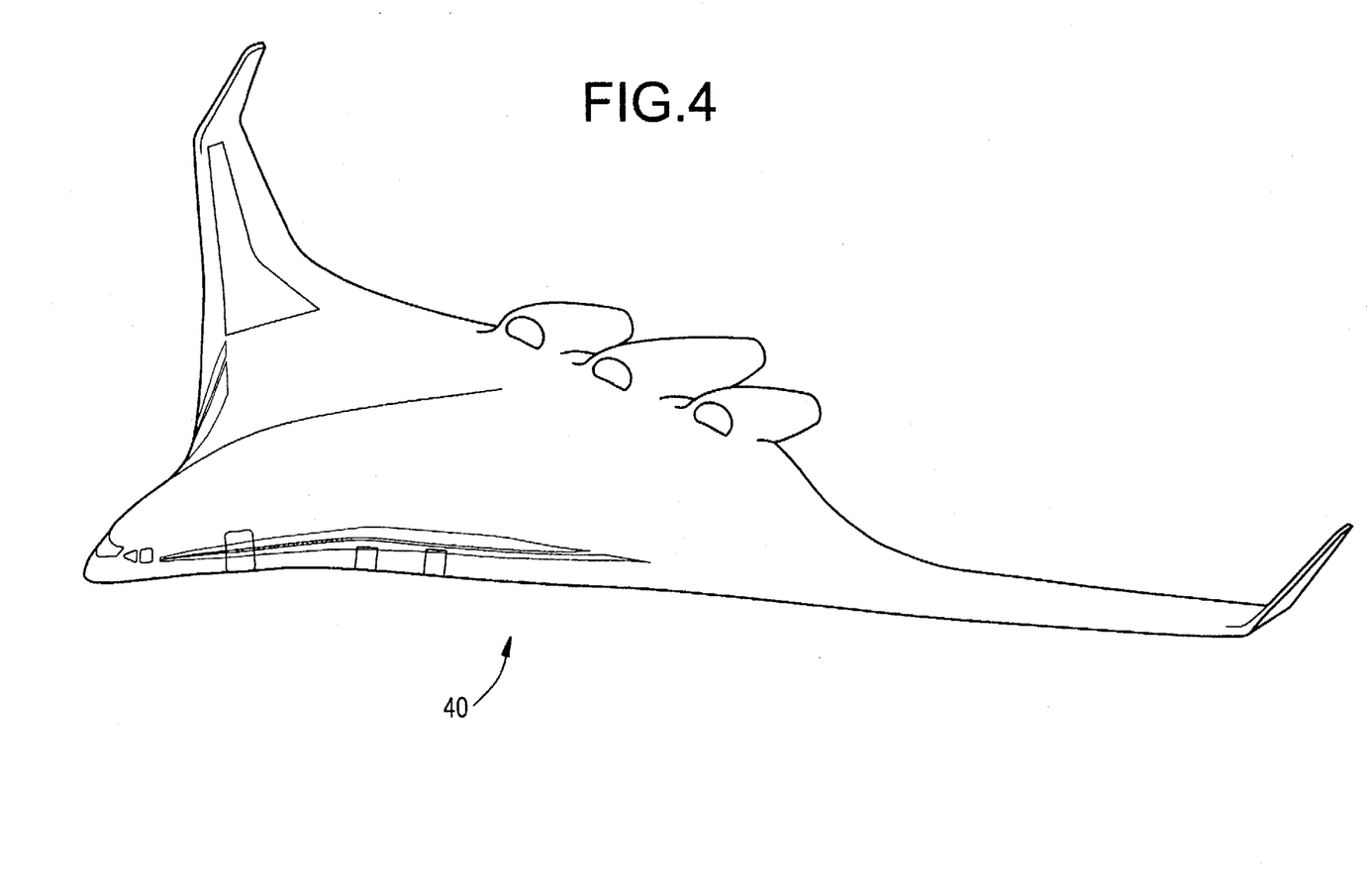
FIG. 4 is a perspective view of a blended wing-body aircraft capable of incorporating the transverse rib of the present invention.
Figure 5:
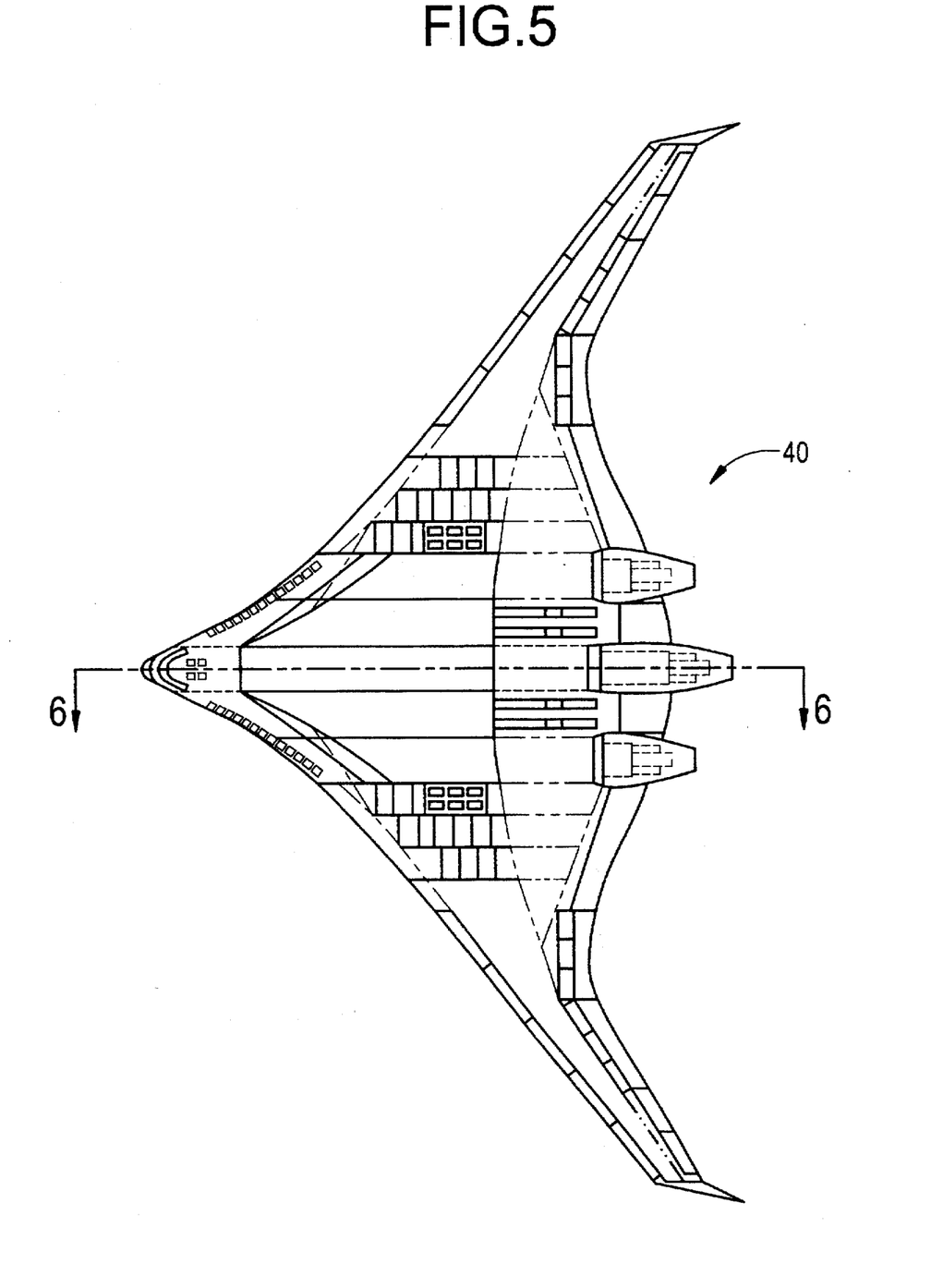
FIG. 5 is a top view of the blended wing-body aircraft shown in FIG. 4.
Figure 6:
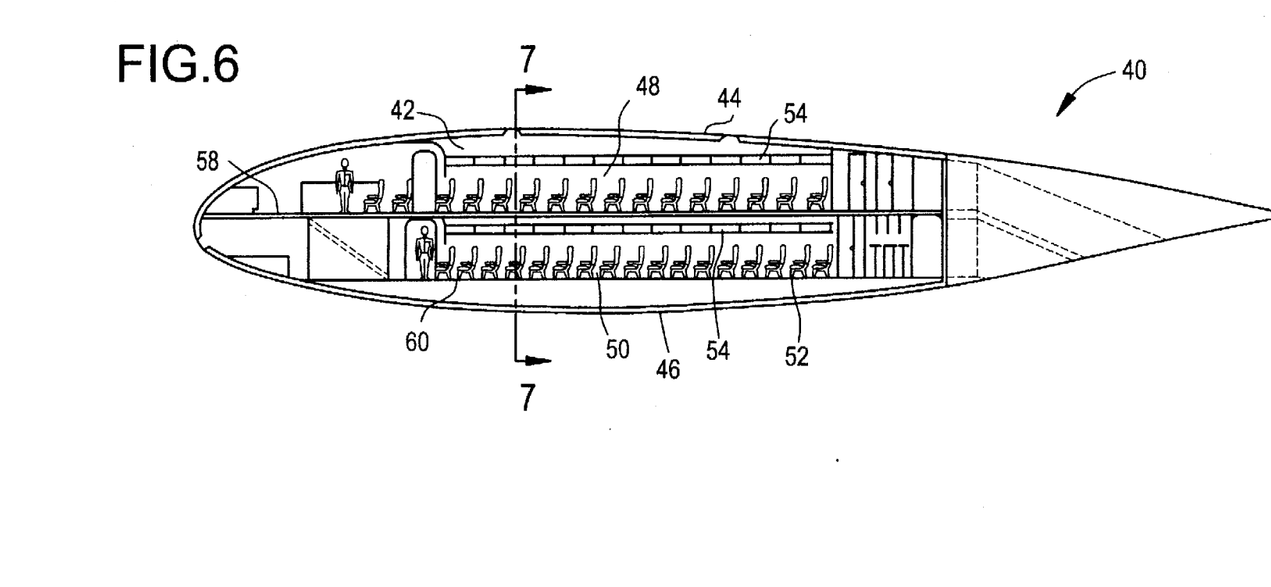
FIG. 6 is a sectional view taken along line 6—6 of FIG. 5, providing a side view of the body and pressure cabin of the blended wing-body aircraft shown in FIG. 4.
Figure 7:
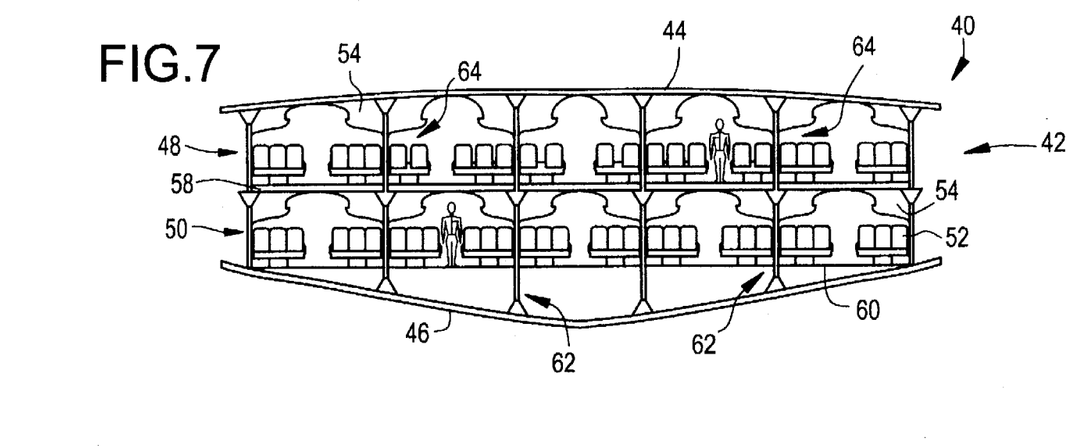
FIG. 7 Is a sectional view taken along line 7—7 of FIG. 6, providing a frontal view of the pressure cabin of the blended wing-body aircraft shown in FIG. 4.

FIG. 4 is a perspective drawing of a blended wing-body aircraft 40, which is a known type of tailless aircraft. FIG. 5 is a top view of aircraft 40. FIG. 6 is a sectional view taken along line 6—6 of FIG. 5, providing a side view of pressure cabin 42 enclosed within aircraft 40. FIG. 7 is a sectional view taken along line 7—7 of FIG. 6, providing a frontal view of pressure cabin 42.

Pressure cabin 42 is formed, in part, by top body section 44 and bottom body section 46. Pressure cabin 42 encloses upper deck 48 and lower deck 50, passenger seats 52, overhead storage bins 54, and ribs 62, 64, which constitute a preferred embodiment of the present invention. Upper deck 48 and lower deck 50 are separated by rigid panel 58, which forms the floor for upper deck 48 and the ceiling for lower deck 50. Lower deck 50 also includes floor 60.

Figure 8:
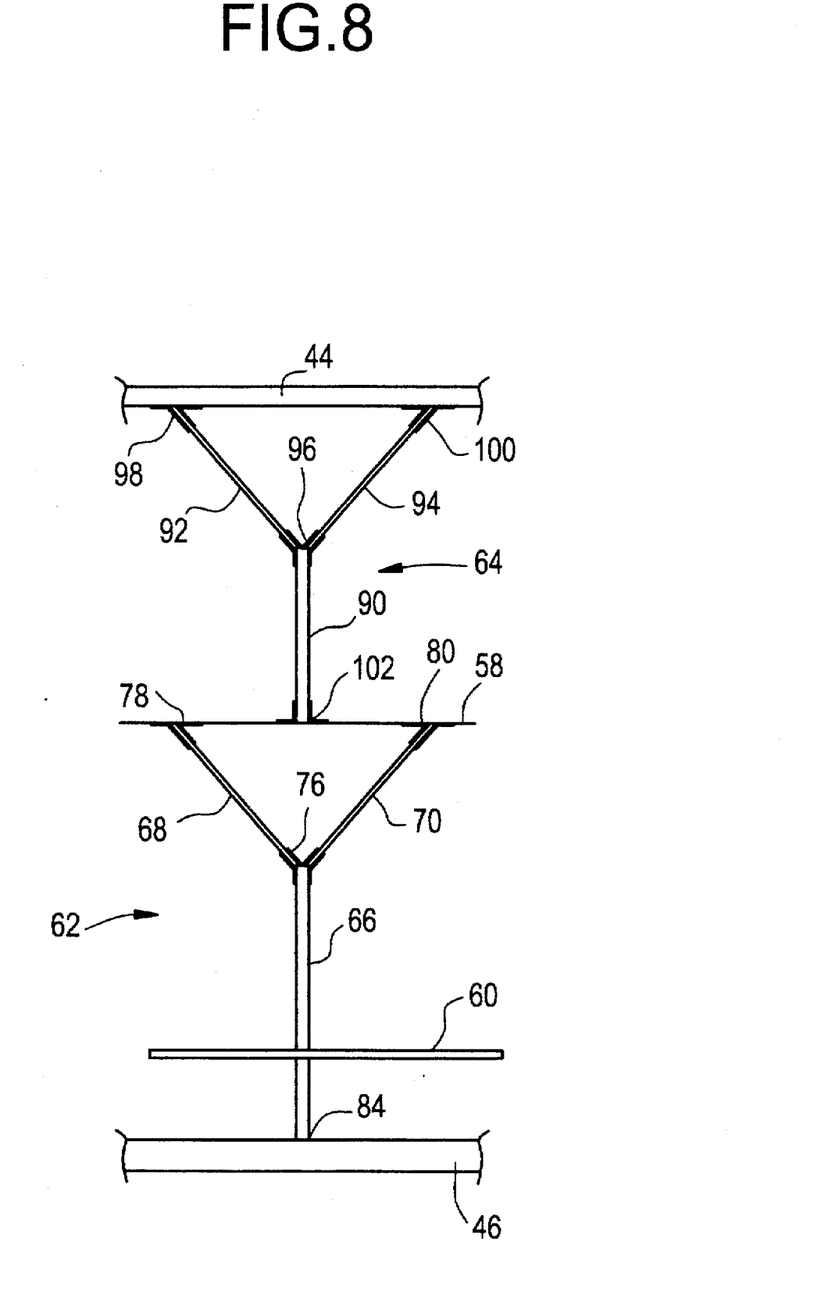
FIG. 8 illustrates a preferred embodiment of the transverse rib of the present invention, for use in the double decked pressure cabin of the blended wing-body aircraft shown in FIG. 4.

FIG. 8 depicts the ribs 62, 64 in greater detail. Rib 62 is comprised of a vertical web 66 and inclined webs 68, 70 which are attached at crotch 76 to the upper edge of the vertical web 66. The rib 62 is located between bottom body section 46 and panel 58. The upper edge 78 of inclined web 68 and the upper edge 80 of the inclined web 70 are attached to panel 58. As shown in FIG. 7, inclined webs 68 and 70 are situated in a space adjacent to overhead storage bins 54. The vertical web 66 passes through the floor 60, and is attached at its bottom edge 84 to the bottom body section 46.

Rib 64 is located between panel 58 and top body section 44. Rib 64 is comprised of a vertical web 90 and inclined webs 92, 100 which are attached at crotch 96 to the upper edge of the vertical web 90. Vertical web 90 of rib 64 is aligned with vertical web 66 of rib 62. The upper edge 98 of the inclined web 92 and the upper edge 100 of the inclined web 94 are attached to the upper body section 44. As shown in FIG. 7, the inclined webs 92 and 94 are situated in space adjacent to the overhead storage bins 54. The bottom edge 102 of the vertical web 90 is attached to the panel 58.

The respective distances between edges 78 and 80, 86 and 88, and 98 and 100 are calculable by methods well known to those reasonably skilled in the art, to prevent unacceptable deflection of panel 58, top body section 44, and bottom body section 46.

Figure 9:
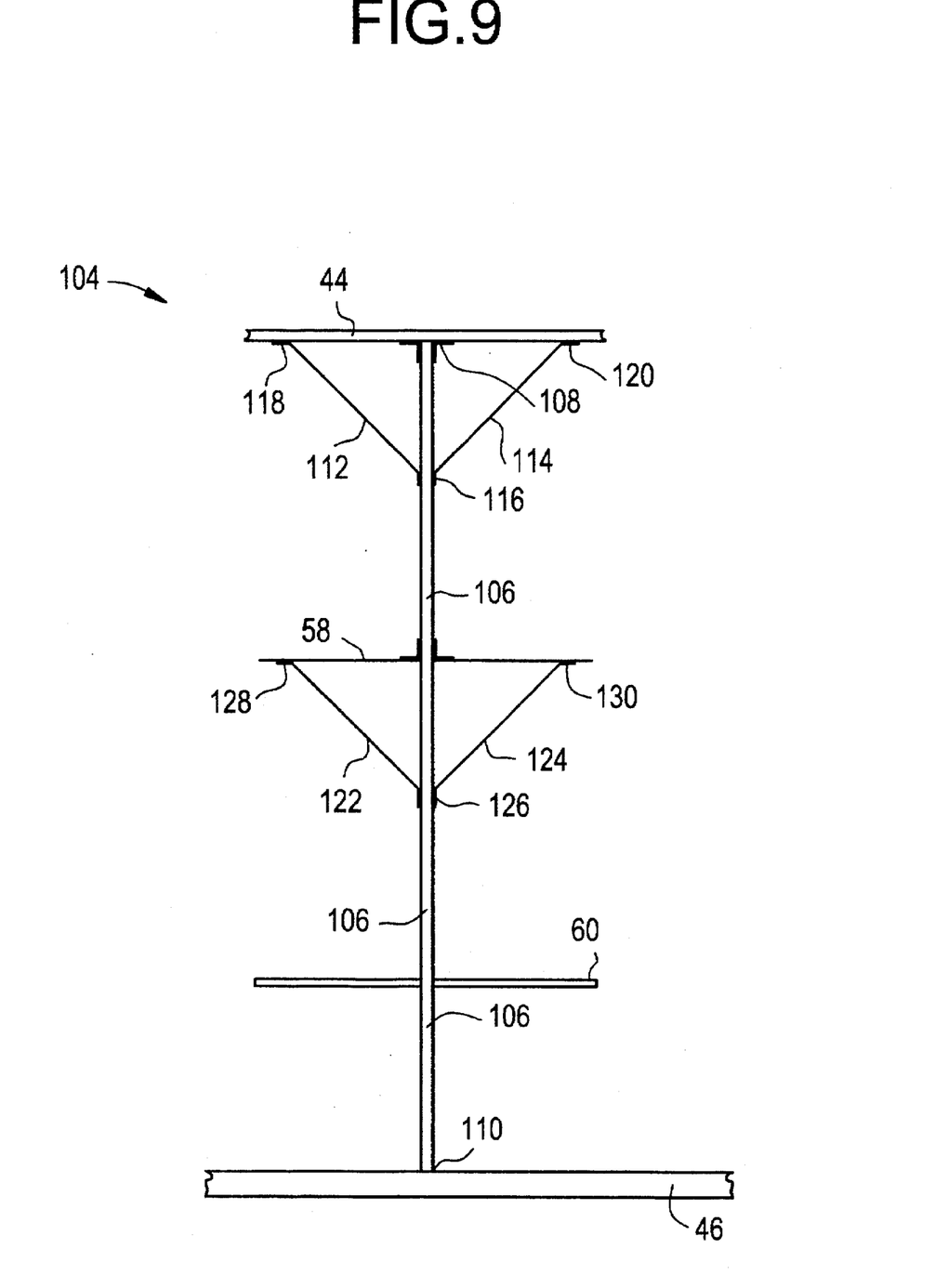
FIG. 9 illustrates another preferred embodiment of the present invention for use in the double decked pressure cabin of the blended wing-body aircraft shown in FIG. 4.

FIG. 9 illustrates a rib 104 which constitutes another preferred embodiment of the present invention, and which can be employed in aircraft 40 in a manner similar to that hereinbefore discussed in connection with rib 56 of the present invention. More particularly, rib 104 is comprised of vertical web 106 having an upper edge 108 and and a lower edge 110. Rib 104 is located between top body section 44 and bottom body section 46, with upper edge 108 being attached to top body section 44 and lower edge 110 being attached to bottom body section 46. The vertical web 106 passes through both the panel 58 and the floor 60 of the lower deck 50.

Inclined webs 112 and 114 intersect and are attached to the vertical web 106 at an intersection 116. Upper edges 118 and 120 of inclined webs 112 and 114, respectively, are attached to the top body section 44. Inclined webs 122 and 124 intersect and are attached to the vertical web 106 at an intersection 126. Upper edges 128 and 130 of inclined webs 122 and 124, respectively, are attached to the panel 58. The "trident" configuration of 104 provides a third load bearing element at each surface to which it is attached, in comparison to the two load bearing elements of the "Y" configuration of rib 56.

Ribs 62, 64, and 104 are depicted in FIGS. 8 and 9 deployed in the double deck configuration of aircraft 40. However, it should be clearly understood that the ribs of the present invention could also be beneficially used in an aircraft having a single deck.

The distances or spacings between the ribs are set so as to reduce weight and avoid unacceptable deformation of the top body section of the pressure cabin, and any panel separating decks within the pressure cabin. The optimal spacing between the ribs is calculable using methods well known to those reasonably skilled in the art. The angles formed by the inclined webs with respect to the vertical web are preferably approximately 45°, but this is not limiting to the present invention. The only requirement is that the angle formed by the inclined webs be less than 180°, i.e., that the angles formed by the inclined webs with respect to the vertical web be less than 90°.

Use of the ribs of the present invention in a blended wing-body aircraft will allow the weight of the top body section and the deck separation panel, to be less than they would be should the aircraft designer forego the use of the ribs of the present invention and rely instead solely on the ribs of the prior art which provide only a single edge for attachment and support. The ribs of the present invention can be spaced apart farther than can the ribs of the prior art. This allows the aircraft designer to utilize significantly more space in the pressure cabin for passengers and their carry-on luggage.

Although presently preferred embodiments of the invention have been described in detail hereinabove, it should be clearly understood that many variations and/or modifications of the basic inventive concepts taught herein which may appear to those skilled in the pertinent art will still fall within the spirit and scope of the present invention as defined in the appended claims. For example, although the ribs of the present invention have been described hereinabove with respect to their use in providing structural support for the pressure cabin of an aircraft, it will be easily understood that the ribs can also be used to provide structural support to any wide-area, laterally-loaded structure with widely-spaced supports, e.g., bridges and overpasses.

What is claimed is:

1. A rib for providing structural support for a non-cylindrical pressure cabin structure of an aircraft which includes vertically spaced-apart first and second structural elements, the rib comprising:

a vertical web positioned and oriented vertically between the first structural element and the second structural element, and the vertical web having a top edge and a bottom edge; and first and second inclined webs each having respective upper and lower edges, wherein the upper edges of the first and second inclined webs are attached to a lower side of the second structural element, and the lower edges of the first and second inclined webs intersect and are attached to the upper edge of the vertical web at an intersection therewith spaced from and located between the first structural element and the second structural element, wherein the first and second inclined webs extend upwardly and outwardly from the intersection with the vertical web in different directions, and wherein the vertical web includes a segment extending straight downward from the intersection with the first and second inclined webs until the bottom edge of the vertical web is attached directly to a top side of the first structural element wherein the segment is devoid of inclined webs connected to the first structural element, whereby the resulting rib is generally Y-shaped.

2. The rib as set forth in claim 1, wherein the first and second inclined webs form a first angle with respect to the vertical web which is less than one hundred and eighty degrees.

3. The rib as set forth in claim 1, wherein:

the pressure cabin is part of an aircraft body having a longitudinal axis of symmetry; and, the rib extends parallel to the longitudinal axis of symmetry.

4. The rib as set forth in claim 1, wherein the structure is a pressure cabin of a blended wing-body aircraft.

5. A rib for providing structural support for a non-cylindrical pressure cabin structure of an aircraft which includes vertically spaced-apart first and second structural elements, the rib comprising:

a vertical web positioned and oriented vertically between the first structural element and the second structural element, and the vertical web having a top edge and a bottom edge, wherein the top edge of the vertical web is attached to a lower side of the second structural element; and first and second inclined webs each having respective upper and lower edges, wherein the upper edges of the first and second inclined webs are attached to the lower side of the second structural element, and the lower edges of the first and second inclined webs intersect and are attached to the vertical web at an intersection therewith spaced from and located between the first structural element and the second structural element, wherein the first and second inclined webs extend upwardly and outwardly from the intersection with the vertical web in different directions, and wherein the vertical web includes a segment extending straight downward from the intersection with the first and second inclined webs until the bottom edge of the vertical web is attached directly to a top side of the first structural element wherein the segment is devoid of inclined webs connected to the first structural element.

6. The rib as set forth in claim 5, wherein the first and second inclined webs form a first angle with respect to the vertical web which is less than one hundred and eighty degrees.

7. The rib as set forth in claim 5, wherein:

the pressure cabin is part of an aircraft body having a longitudinal axis of symmetry; and, the rib extends parallel to the longitudinal axis of symmetry.

8. The rib as set forth in claim 5, wherein the structure is a pressure cabin of a blended wing-body aircraft.

9. A rib for providing structural support for a non-cylindrical pressure cabin structure of an aircraft which includes vertically spaced-apart first, second, and third structural elements, the rib comprising:

a vertical web having a top edge and a bottom edge and extending between the first structural element and the third structural element, and passing through the second structural element, wherein the top edge of the vertical web is attached to a lower side of the third structural element; and first and second inclined webs each having respective upper and lower edges, wherein the upper edges of the first and second inclined webs are attached to the lower side of the third structural element, and the lower edges of the first and second inclined webs intersect and are attached to the vertical web at a first intersection spaced from and located between the second and third structural elements, wherein the first and second inclined webs extend upwardly and outwardly from the first intersection with the vertical web in different directions, and wherein the vertical web includes a segment extending straight downward from the first intersection with the first and second inclined webs until the bottom edge of the vertical web is attached directly to a top side of the second structural element wherein the segment is devoid of inclined webs connected to the second structural element; and third and fourth inclined webs each having respective upper and lower edges, wherein the upper edges of the third and fourth inclined webs are attached to a lower side of the second structural element, and the lower edges of the third and fourth inclined webs intersect and are attached to the vertical web at a second intersection spaced from and located between the first and second structural elements, wherein the third and fourth inclined webs extend upwardly and outwardly from the second intersection with the vertical web in different directions, and wherein the vertical web includes a segment extending straight downward from the second intersection with the third and fourth inclined webs until the bottom edge of the vertical web is attached directly to a top side of the first structural element wherein the segment is devoid of inclined webs connected to the first structural element.

10. The rib as set forth in claim 9, wherein:

the first and second inclined webs form a first angle with respect to the vertical web which is less than one hundred and eighty degrees; and, the third and fourth inclined webs form a second angle with respect to the vertical web which is less than one hundred and eighty degrees.

11. The rib as set forth in claim 9, wherein:

the first and second inclined webs each form an angle of approximately forty-five degrees with respect to the vertical web; and, the third and fourth inclined webs each form an angle of approximately forty-five degrees with respect to the vertical web.

12. The rib as set forth in claim 9, wherein:

the pressure cabin is part of an aircraft body having a longitudinal axis of symmetry; and, the rib extends parallel to the longitudinal axis of symmetry.

13. The rib as set forth in claim 9, wherein the structure is a pressure cabin of a blended wing-body aircraft.

14. The rib as set forth in claim 9, wherein the structure is a double-decked pressure cabin of a blended wing-body aircraft.

* * * * *